(12) United States Patent
Hammam et al.

(10) Patent No.: US 11,119,871 B2
(45) Date of Patent: Sep. 14, 2021

(54) SYSTEMS AND METHODS RECOVERING FROM THE FAILURE OF A SERVER LOAD BALANCER

(71) Applicant: Telefonaktiebolaget LM Ericsson (publ), Stockholm (SE)

(72) Inventors: Tarik Hammam, Kista (SE); Anders Franzen, Trangsund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 731 days.

(21) Appl. No.: 15/656,603

(22) Filed: Jul. 21, 2017

(65) Prior Publication Data

US 2017/0322855 A1    Nov. 9, 2017

Related U.S. Application Data

(63) Continuation of application No. 13/703,407, filed as application No. PCT/IB2010/053207 on Jul. 13, 2010, now abandoned.

(51) Int. Cl.
*G06F 11/20* (2006.01)
*H04L 29/08* (2006.01)
*H04L 29/14* (2006.01)

(52) U.S. Cl.
CPC ...... *G06F 11/2005* (2013.01); *H04L 67/1002* (2013.01); *H04L 69/40* (2013.01)

(58) Field of Classification Search
CPC ............ G06F 11/2007; G06F 11/2005; H04L 67/1002; H04L 67/1029; H04L 67/1034; H04L 67/40
See application file for complete search history.

(56) References Cited

U.S. PATENT DOCUMENTS 5,774,660 A    6/1998  Brendel et al.
6,731,598 B1   5/2004  Béliveau et al.
(Continued)

FOREIGN PATENT DOCUMENTS

WO    2007071607 A1    6/2007

OTHER PUBLICATIONS

InternationalSearch Report and Written Opinion dated Apr. 26, 2011 in International Application No. PCT/IB2010/053207, 10 pages.
(Continued)

*Primary Examiner* — Jigar P Patel
(74) *Attorney, Agent, or Firm* — Rothwell, Figg, Ernst & Manbeck, P.C.

(57) ABSTRACT

The invention provides, in one aspect, a server load balancer (SLB) recovery method that replicates a primary SLB's connection data after the primary SLB experiences a failure, as opposed to before it experiences a failure as is currently done in the known hot stand-by recovery method. In some embodiments, this is made possible by (1) employing a replication agent on each target processing unit (e.g., each processing unit on which a server application runs) and (2) transmitting, from the primary SLB, connection data information (i.e., information comprising a session identifier) to the replication agent running on the target processing unit to which the session is mapped, which replication agent will store the data until it is required to transmit the data to a cold stand-by SLB.

20 Claims, 4 Drawing Sheets

(56) References Cited

U.S. PATENT DOCUMENTS

| | | | |
|---|---|---|---|
| 7,139,926 B1 | 11/2006 | Madhav et al. | |
| 7,512,702 B1 | 3/2009 | Srivastava et al. | |
| 8,788,640 B1 | 7/2014 | Masters | |
| 9,935,880 B2 | 4/2018 | Hammam et al. | |
| 2002/0073211 A1 | 6/2002 | Lin et al. | |
| 2002/0138551 A1 | 9/2002 | Erickson | |
| 2003/0161296 A1* | 8/2003 | Butler | H04L 29/06 370/352 |
| 2005/0132030 A1* | 6/2005 | Hopen | H04L 67/1008 709/223 |
| 2005/0286517 A1* | 12/2005 | Babbar | H04L 45/00 370/389 |
| 2006/0248213 A1 | 11/2006 | Sherer et al. | |
| 2007/0174660 A1 | 7/2007 | Peddada | |
| 2007/0220302 A1* | 9/2007 | Cline | G06F 11/2035 714/4.1 |
| 2010/0030880 A1* | 2/2010 | Joshi | H04L 67/1095 709/223 |
| 2010/0057829 A1* | 3/2010 | Sedlacek | H04L 67/1008 709/202 |
| 2010/0241715 A1* | 9/2010 | Takase | H04L 67/24 709/206 |
| 2010/0246517 A1 | 9/2010 | Pradas et al. | |
| 2012/0011504 A1 | 1/2012 | Ahmad et al. | |
| 2014/0347993 A1 | 11/2014 | Hammam et al. | |

OTHER PUBLICATIONS

International Preliminary Report dated Aug. 30, 2012 in International Application No. PCT/IB2010/053207, 5 pages.
Non-Final Office Action issued in U.S. Appl. No. 14/370,289, dated May 19, 2016, 17 pages.
Final Office Action issued in U.S. Appl. No. 14/370,289, dated Dec. 22, 2016, 19 pages.
Advisory Office Action issued in U.S. Appl. No. 14/370,289, dated Mar. 9, 2017, 4 pages.
Non-Final Office Action issued in U.S. Appl. No. 14/370,289, dated May 12, 2017, 20 pages.

* cited by examiner

SYSTEMS AND METHODS RECOVERING FROM THE FAILURE OF A SERVER LOAD BALANCER

CROSS-REFERENCE TO RELATED APPLICATIONS

This application is a continuation of application Ser. No. 13/703,407, having a 35 U.S.C. § 371(c) date of Dec. 11, 2012 (published as US 20130086414), which is a 35 U.S.C. § 371 National Stage of International Patent Application No. PCT/IB2010/053207, filed Jul. 13, 2010. The above identified application and publication are incorporated by reference.

TECHNICAL FIELD

The invention relates the field of server load balancing.

BACKGROUND

A server load balancer (SLB) is device (hardware and/or software) for balancing session traffic across a set of applications (e.g., server applications), each of which runs on a processing unit (e.g., a server computer, a blade server, etc.). In many environments it is desired to have in-place a stand-by SLB in case the primary SLB fails. It is known that the stand-by SLB can either be a "hot" stand-by or a "cold" stand-by. When using a hot stand-by SLB it is required that connection data (e.g., a connection table) that is used by the primary SLB in balancing traffic across the server applications be replicated to the hot stand-by SLB prior to the failure of the primary SLB. Typically, this replication is accomplished by updating connection data accessible to the hot stand-by SLB each time the connection data maintained by the primary SLB is updated. An advantage of using a hot stand-by SLB is that, in case a failure of the primary SLB (or "active" SLB) occurs, a switchover to the stand-by SLB occurs and this stand-by SLB would have connection data that is identical to the connection data that was maintained by the primary SLB, thereby enabling the stand-by SLB to takeover as primary SLB and continue balance traffic for the already established sessions as well as new session.

A problem with using the hot stand-by method is that if the hot stand-by fails, then the connection data will be lost. Moreover, the hot stand-by method requires that the hot stand-by SLB work in tandem with the primary SLB so that the primary SLB's connection data can be replicated. Another problem with the hot stand-by method occurs when some event (e.g., power failure, operating system crash, hardware fault) causes the primary SLB and a target processing unit (e.g., a processing unit on which a server application runs) to fail at more less the same time. When such a situation arises, the replicated connection data that is used by the stand-by SLB may include invalid information (e.g., information mapping a session to the failed target processing unit). This could cause the hot stand-by SLB to forward traffic to the failed target processing unit, which is undesirable because the traffic will not get processed due to the failure of the target processing unit.

A problem with using a cold stand-by SLB is that there is no replication of the primary SLB's connection data, and this means that the cold stand-by SLB can not route traffic corresponding to a session that was established before the primary SLB failed.

What is desired, therefore, are improved systems and methods for recovering from the failure of an SLB.

SUMMARY

In one aspect, the invention provides an SLB recovery method that replicates the primary SLB's connection data after the primary SLB experiences a failure, as opposed to before it experiences a failure as is currently done in the known hot stand-by recovery method. In some embodiments, this is made possible by (1) employing a replication agent on each target processing unit (e.g., each processing unit on which a server application runs) and (2) transmitting, from the primary SLB, connection data information (i.e., information comprising a session identifier) to the replication agent running on the target processing unit to which the session is mapped, which replication agent will store the connection data information until it is required to transmit the data to a cold stand-by SLB.

By having the primary SLB transmit connection data information to the replication agent, the replication agent can provide the connection data information to the cold stand-by SLB in the event the primary SLB experiences a failure. This provides the advantage of enabling a system design solution that can capitalize on the flexibility of cold stand-by methods yet is still able to protect established sessions because the cold stand-by SLB can receive from one or more replication agents connection data information that maps an established session to a particular target processing unit. This is particularly useful in server farms and clustered system designs.

Moreover, the above described embodiment provides protection against multiple SLB failures because, in the event of a primary SLB failure and a cold stand-by failure, a second cold stand-by SLB can easily replicate the necessary connection data by merely receiving the necessary information from the replication agents.

Additionally, some embodiments of the invention solve the above described problem that occurs when an event (e.g., power failure, operating system crash, hardware fault, etc) causes the primary SLB and a target processing unit to fail at more less the same time. As described above, in such a situation, the conventional stand-by SLB will have connection data (e.g., a connection table) that includes invalid connection data information (e.g., a records that maps a session to the failed target processing unit). However, if such a situation occurs in a system according to some embodiment of the invention, the replicated connection data used by the stand-by SLB will not contain any such invalid connection data information. This is so because, in some embodiments, the stand-by SLB receives its connection data information from the target processing unit themselves after the primary SLB fails. Thus, if a target has failed at more or less the same time as the primary SLB, then the stand-by SLB will not receive any connection data information from the failed target. Hence, the stand-by SLB will not have connection data that includes connection data information that maps a session to the failed target.

One aspect of the invention provides a method, performed by a stand-by SLB. In some embodiments, this method includes: replicating, by the stand-by SLB, at least a portion of connection data maintained by the primary SLB such that the replicated connection data is accessible to the stand-by SLB, characterized in that the replicating step occurs in response to a detection of the failure of the primary SLB. After the replicating step, the stand-by SLB may: (a) receive traffic corresponding to a session; (b) access the replicated connection data to determine a target processing unit to which the session is mapped; and (c) forward the traffic to the determined target processing unit (i.e., the stand-by SLB become the primary SLB).

After the replicating step, the stand-by SLB (which is now a primary SLB) may further: receive traffic corresponding to a second session and access the replicated connection data to determine whether the accessed data comprises information mapping the second session to any of a plurality of target processing units. In response to determining that the accessed data does not comprise information mapping the second session to any of the plurality of target processing units, the stand-by SLB is configured to: (a) select a particular target processing unit; (b) update the replicated connection data so that the replicated connection data will comprise information mapping the second session with the selected target processing unit; and (c) transmit to a replication agent running on the selected target processing unit a connection data update message comprising a session identifier identifying the second session.

In some embodiments, the step of replicating the connection data comprises: receiving, at the stand-by SLB, a replication message transmitted from a target processing unit, wherein the replication message contains a session identifier identifying a session; and in response to receiving the replication message, storing information that maps the session with the target processing unit. In some embodiments, the replication message may contain a plurality of session identifiers, each identifying a different session, and, in response to receiving the replication message, the stand-by SLB stores information mapping each of the plurality of session identifiers with the target processing unit.

In some embodiments, the method further includes: transmitting, in response to the failure of the primary SLB, a connection data synchronization message to each of a first and a second target processing unit, wherein each of the first and second target processing units is configured to transmit one or more replication messages to the stand-by SLB in response to receiving the connection data synchronization message.

In some embodiments, the connection data maintained by the primary SLB comprises first information mapping a first session to the first target processing unit and second information mapping a second session to the second target processing unit, wherein the first information consists of a first record comprising a first field storing a session identifier identifying the first session and a second field storing a target processing unit identifier identifying the first target processing unit, and the second information consists of a second record comprising a second field storing a session identifier identifying the second session and a second field storing a target processing unit identifier identifying the second target processing unit.

In some embodiments, the step of receiving, at the stand-by SLB, traffic corresponding to a session consists of receiving, at the stand-by SLB, a network packet comprising information identifying the session, wherein the network packet is an Internet Protocol (IP) packet that contains an IP header and a payload, wherein the payload contains a transport layer segment having a transport layer header and payload, and data from the IP header and transport layer header identifies the network packet as corresponding to the session.

In some embodiments, the primary SLB may execute on one of the target processing units. In this case, the replicated connection data may not contain information that maps any session to the target processing unit on which the primary SLB was running when it failed. This, as described above, is advantageous because it is undesirable for the stand-by SLB to attempt to forward traffic to a failed target, which could happen if the connection table used by the stand-by SLB contains a record that maps a session to a failed target processing unit.

In another aspect, the invention provides an improved stand-by server load balancer (SLB). The improved stand-by SLB is configured to recover from the failure of a primary SLB, which is operable to use stored connection data to balance traffic across a plurality of target processing units using. The stored connection data comprises information mapping sessions with target processing units. Advantageously, in one embodiment, the stand-by SLB is configured such that, in response to a detection of the failure of the primary SLB, the stand-by SLB replicates the connection data (or most of the connection data) to create replicated connection data. The replicated connection data is accessible to the stand-by SLB so that the stand-by SLB can use the replicated connection data to balance traffic across the plurality of target processing units.

In some embodiments, the stand-by SLB is configured to replicate the connection data by receiving one or more replication messages from one or more of the target processing units, each of the one or more replication message comprising a session identifier and a target processing unit identifier. In some embodiments, the stand-by SLB is further configured such that, in response to the failure of the primary SLB, the stand-by SLB transmits a connection data synchronization message to at least one of the plurality of target processing units.

In some embodiments, the connection data comprises a record comprising a first field storing a session identifier identifying a session and a second field storing a target processing unit identifier identifying a target processing unit, and the replicated connection data comprises a record comprising a first field storing the session identifier identifying the session and a second field storing the target processing unit identifier identifying the target processing unit.

The stand-by SLB may be further operable to: receive a network packet corresponding to a session; use the replicated connection data to determine the target processing unit to which the session is mapped; and forward the network packet to the determined target processing unit. The network packet may be an Internet Protocol (IP) packet that contains an IP header and a payload, wherein the payload contains a transport layer segment having a transport layer header and payload, and data from the IP header and transport layer header identifies the network packet as corresponding to the session.

In another aspect, the invention provides an improved primary server load balance (SLB) for balancing traffic across a plurality of target processing units. The primary SLB is operable to receive traffic corresponding to a session and access connection data to determine whether the connection data comprises information mapping the session to any of the plurality of target processing units. Advantageously, in response to determining that the connection data does not comprise information mapping the session to any of the plurality of target processing units, the primary SLB selects a particular target processing unit from the plurality of target processing units, updates the connection data so that the connection data will comprise information mapping the session with the selected target processing unit, and transmits to a replication agent running on the selected target processing unit a connection data update message comprising a session identifier identifying the session. The connection update message may comprise a target processing unit identifier for identifying the selected target processing unit.

In another aspect, the invention provides a computer program product comprising a computer usable medium having a computer readable program code embodied therein, said computer readable program code adapted to be executed to implement a method comprising: accessing connection data, in response to receiving traffic corresponding to a session, to determine whether the connection data comprises information mapping the session to any of the plurality of target processing units; and in response to determining that the connection data does not comprise information mapping the session to any of the plurality of target processing units: (a) selecting a particular target processing unit from the plurality of target processing units and (b) updating the connection data so that the connection data will comprise information mapping the session with the selected target processing unit. Characterized in that the method further comprises, in further response to determining that the connection data does not comprise information mapping the session to any of the plurality of target processing units, transmitting to a replication agent running on the selected target processing unit a connection data update message comprising a session identifier identifying the session.

In another aspect, the invention provides a computer program product comprising a computer usable medium having a computer readable program code embodied therein, said computer readable program code adapted to be executed to implement a method comprising: replicating connection data used by a primary server load balancer (SLB) immediately in response to a detection that the primary SLB has failed; and using the replicated connection data to balance traffic across a plurality of target processing units.

In another aspect, the invention provides, a target processing unit, wherein the target processing includes a replication agent. Advantageously, the replication agent is operable to: receive from a primary server load balancer (SLB) a connection data update message comprising a session identifier identifying a session; and store the session identifier in response to receiving the connection data update message, characterized in that: the replication agent is configured to transmit the session identifier to a stand-by SLB in response to receiving a synchronization message.

The replication agent, in some embodiments, is further operable to: receive from the primary SLB a second connection data update message comprising a second session identifier identifying a second session; and store the second session identifier in response to receiving the second connection data update message, characterized in that: the replication agent is configured such that, in response to receiving the synchronization message, the replication agent transmits to the stand-by SLB a replication message containing the first and second session identifiers. The replication message may further contain an identifier identifying the target processing unit.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
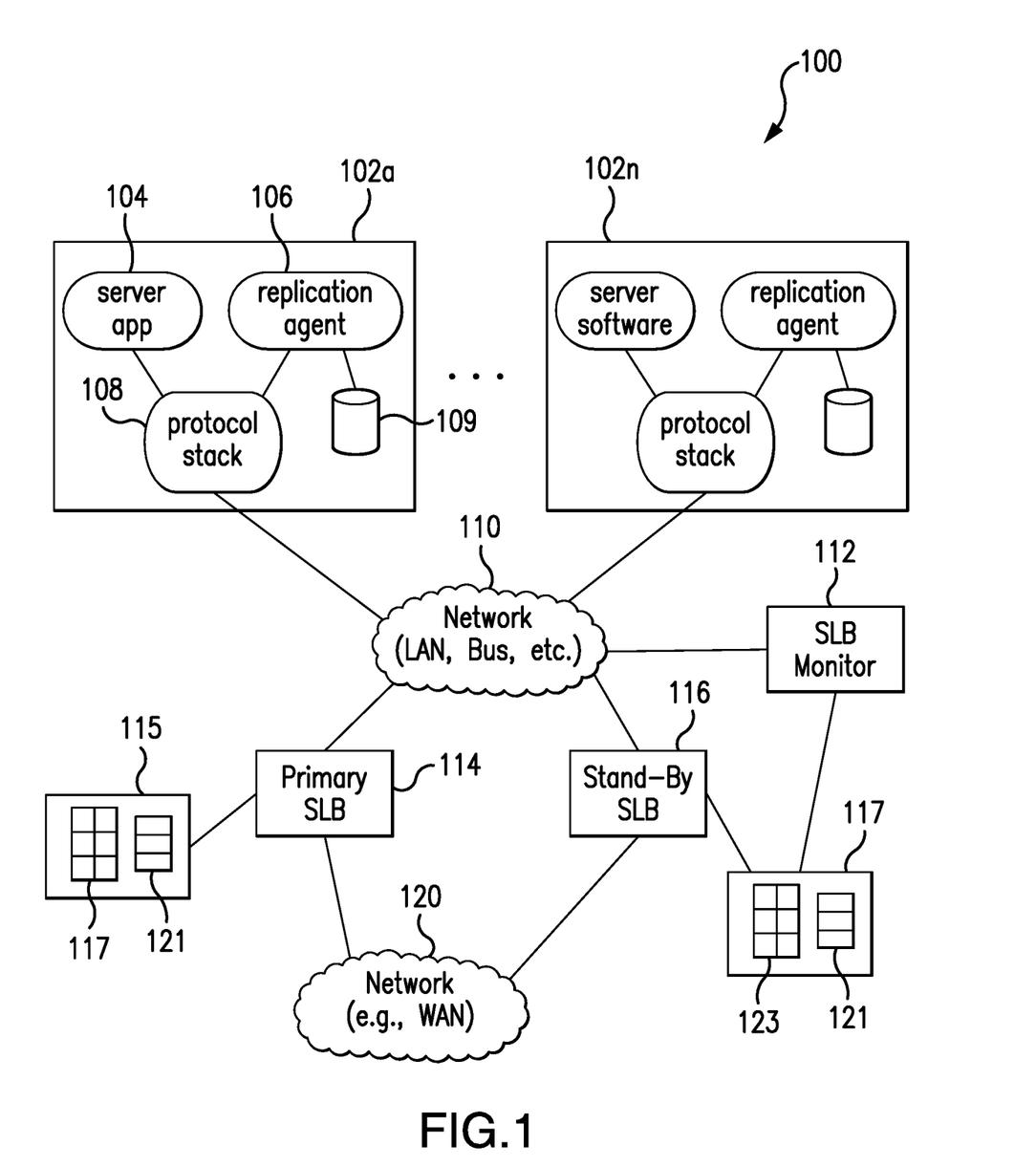
FIG. 1 illustrates a system according to an embodiment of the invention.

Referring now to FIG. 1, FIG. 1 illustrates a system 100 according to an embodiment of the invention. System 100 includes a primary SLB 114 that is operable to balance session traffic across, among other things, a set of server applications 104, each of which runs on a processing unit 102. Also running on each processing unit 102a to 102n, is a replication agent 106.

Figure 2:
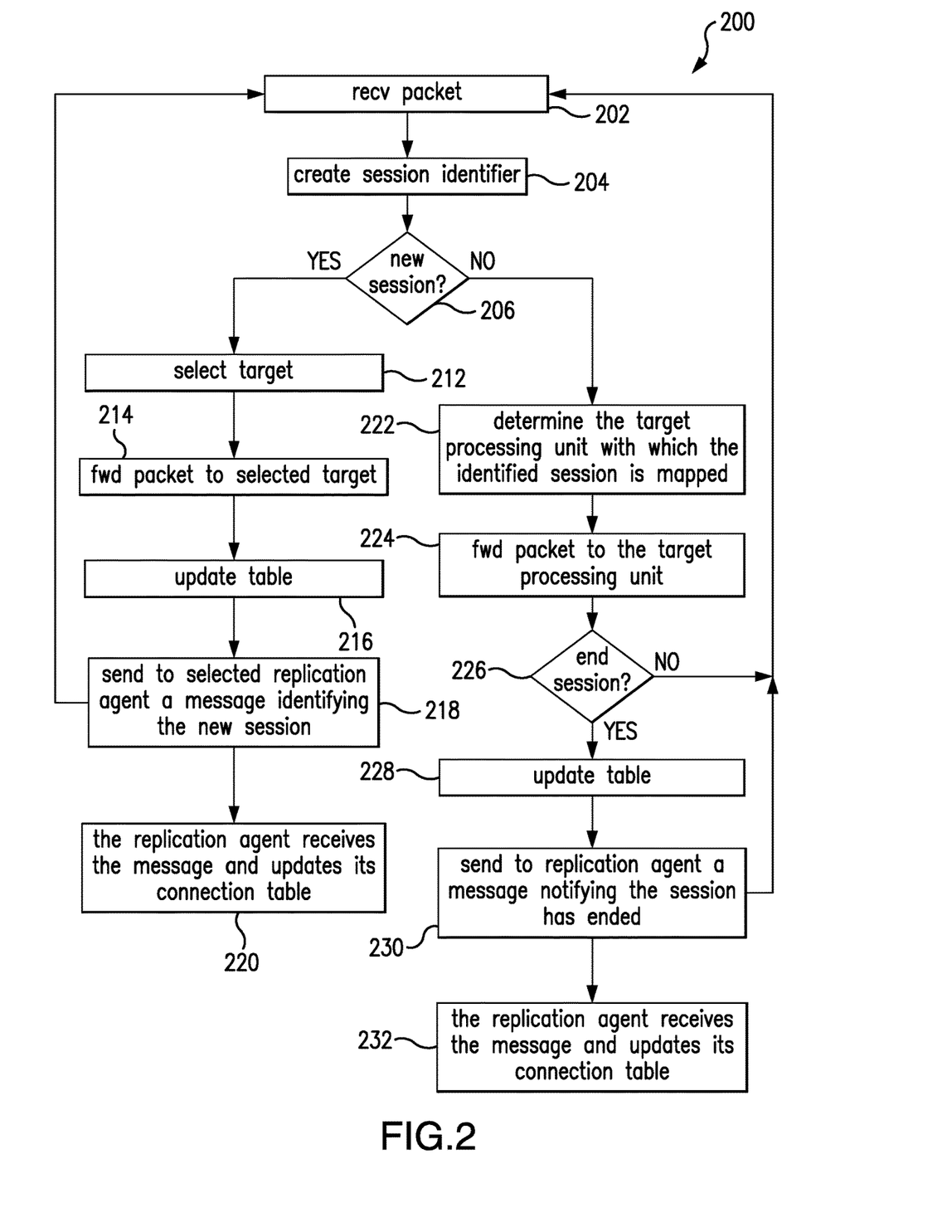
FIG. 2 is a flow chart illustrating a processes according an embodiment of the invention.

FIG. 2 is a flow chart illustrating a process 200, according to some embodiments, that is performed by primary SLB 114. Process 200 may begin in step 202, where primary SLB 114 receives session traffic (e.g., a packet), via network 120, transmitted from some device (not shown) connected to network 120, which may be an Internet Protocol (IP) network, such as the Internet, other network. Thus, in some embodiments, the received traffic is an IP packet, which, as is well known in the art, includes a header and payload. For the sake of simplicity, we shall assume that in step 202 SLB 114 received an IP packet.

In step 204, SLB 114 extracts data from the received packet to generate a session identifier (e.g., a data structure, such as a string of bits or other structure, containing data from certain fields of the packet that together identify a session). For example, in step 204, assuming the IP packet encapsulates a Transmission Control Protocol (TCP) packet or a User Datagram Protocol (UDP) packet, SLB 114 may form a data structure containing: (a) the following items from the IP header of the packet: source address, destination address, version (e.g. IPv4 or IPv6), and protocol (e.g., TCP or UDP) and (b) the following items from the TCP/UDP header: source port and destination port.

In step 206, SLB 114 determines whether the packet corresponds to a new session. In the case where the packet is a TCP/IP packet, in some embodiments, SLB 114 determines whether the packet corresponds to a new session by determining if the packet contains a TCP packet that indicates that the TCP packet is a TCP connection request (i.e., the SYN bit of the TCP packet is set).

In the case where the packet is a UDP/IP packet, in some embodiments, SLB 114 determines whether the packet corresponds to a new session by determining whether the generated session identifier matches a session identifier stored in a connection table 117 stored in storage unit 115, which may be a volatile (e.g., RAM) or non-volatile storage unit. In some embodiments, connection table 117 stores connection data that includes information mapping sessions to target processing units 102. For example, the connection data may include a plurality of records, where each record comprises a first field for storing a session identifier identifying a session and a second field for storing a processing unit identifier (e.g., an IP address) associated with a target processing unit 102. In some embodiments, the records may include additional fields.

If the traffic corresponds to a new session, then the process proceeds to step 212, otherwise it proceeds to step 222.

In step 212, SLB 114 selects a target processing unit. For example, a table 121 of targeting processing unit identifiers may be stored in storage unit 115, and SLB 114 selects a target processing unit in step 212 by, for example, randomly selecting from the table 121 an identifier that identifies a target processing unit.

In step 214, SLB 114 forwards the packet received in step 202 to the selected target processing unit 102. The packet is then received and processed by protocol stack 108 and, if the packet contains application data, then the application data contained in the packet is provided to server application 104.

In step 216, SLB 114 updates connection table 117. For example, in step 216, SLB 114 may add a record to table 117, which record contains in one field the session identifier generated in step 204 and in another field a target processing unit identifier that identifies the target processing unit selected in step 212.

Advantageously, in some embodiments, in step 218, SLB 114 sends to the selected target processing unit a connection data update message that includes the generated session identifier. This message is received by a protocol stack 108 running on the target processing unit 102 and the message is then provided to the replication agent 106 running on the target processing unit 102. Replication agent 106, in response to receiving the message, stores in storage unit 109 the session identifier included in the connection update message (step 220). Accordingly, a portion of connection table 117 is duplicated in storage unit 109. This provides the distinct advantage of enabling replication agent 106 to inform stand-by SLB 116 of the active sessions that were handled by primary SLB 114, as well as the target processing units associated with those active sessions, in the event primary SLB 114 experiences a failure. This information regarding the active sessions enables the cold stand-by SLB 114 to take over the handling of these active sessions.

While replication agent 106 is shown as being separate and apart from protocol stack 108 (i.e., replication agent 106 is a user application), this was done solely for the sake of illustration. In some other embodiments, replication agent 106 may be part of protocol stack 108 or some other part of the operating system. In the case where, replication agent 108 is a part of protocol stack 108, step 218 may be unnecessary because (a) the replication agent 106 may obtain from the protocol stack 108 a copy of the packet (or a copy of some portion of the packet) that was forwarded in step 214 and (b) replication agent 106 can be configured to use this information to generate the session identifier in the same manner that SLB 114 generates the session identifier as described above. After replication agent 106 generates the session identifier, agent 106 can store it in storage unit 109.

In step 222, SLB 114 determines the target processing unit that is associated with the generated session identifier. SLB 114, in some embodiments, makes this determination by selecting the record in connection table 117 that includes a session identifier that matches the session identifier generated in step 204. This selected record will contain a target processing unit identifier that identifies the target processing unit associated with the generated session identifier.

In step 224, SLB 114 forwards the packet received in step 202 to the determined target processing unit 102. In step 226, SLB 114 determines whether the packet indicates the end of the session. For example, in the case where the packet is a TCP/IP packet, SLB 114 determines that the packet indicates the end of the session when the FIN bit of the TCP packet is set. If the packet does not indicate the end of the session, the process may proceed back to step 202, where SLB 114 receives a new packet. If the packet indicates the end of the session, then SLB 114 updates its connection table by removing the record in the table that contains a session identifier that matches the session identifier generated in step 204 (step 228). In step 230, SLB 114 sends to the replication agent on the determined target processing unit a connection data update message that includes the generated session identifier (the message may also include an end-of-session indication). In response to receiving this message, the replication agent 106 removes from storage unit 109 the session identifier that matches the session identifier included in the message (step 232).

Figure 3:
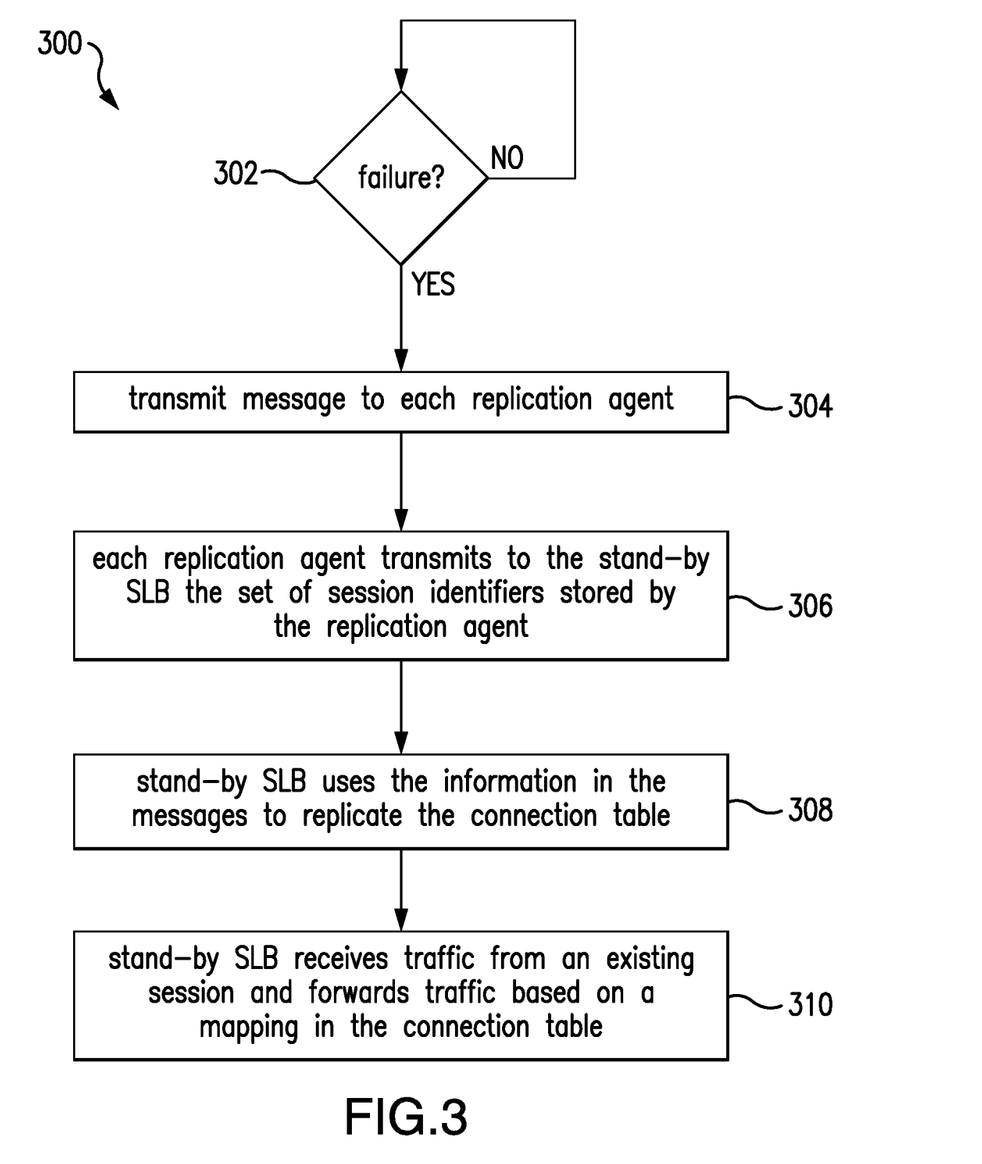
FIG. 3 is a flow chart illustrating a processes according an embodiment of the invention.

Referring now to FIG. 3, FIG. 3 is a flow chart illustrating a process 300 that shows steps that are preformed in the event primary SLB 114 experiences a failure. Process 300 may begin in step 302, where SLB monitor 112 determines whether SLB 114 has experienced a failure. If SLB 114 has not experienced a failure, SLB monitor 112 continues monitoring SLB 114. In the event of a failure, process 300 proceeds to step 304.

In step 304, a control message (a.k.a., a connection data synchronization message) is transmitted to each target processing unit 102a to 102n (or each target processing unit identified in table 121). Each control message may be addressed to the replication agent 106 running on the target processing unit to which the control message was sent, thus, the control message is provided to the replication agent. The control message may be sent by SLB monitor 112 in response to it determining that SLB 114 has failed. While SLB monitor 112 is shown as being separate and apart from stand-by SLB 116, this is not a requirement as monitor 112 may be a module of SLB 116.

In response to receiving the control message, the replication agent 106 transmits to stand-by SLB 116 each of the session identifiers it stored in storage unit 109 if it hasn't earlier removed the session identifier from the storage unit (step 306). For example, replication agent 106 may transmit to SLB 116 a replication message comprising the set of session identifiers. Replication agent 106 may obtain the network address of stand-by SLB 116 from a configuration file stored in storage unit 109 or it may be included in the control message.

In step 308, stand-by SLB 116 uses the session identifiers it receives from each replication agent to form connection table 123, which, at least in part, is a replication of connection table 117. Thus, connection table 123 is replicated connection data. For example, for each session identifier that SLB 116 receives from a particular replication agent 106, SLB 116 may add to table 123 a record comprising a first field that stores the session identifier and a second field that stores a target processing unit identifier that identifies the target processing unit on which the replication agent is running, thereby storing information that maps the session identified by the session identifier with the target processing unit identified by the target processing unit identifier. This target processing unit identifier may be included in the replication message sent by the replication agent in step 306.

In step 310, SLB 116 receives session traffic (e.g., a packet), via network 120, transmitted from some device (not shown) connected to network 120, and uses the information mapping sessions to target processing units (e.g., connection table 123) to forward the packet to the appropriate target processing unit as described above in connection with FIG. 2.

Referring back to FIG. 1, while primary SLB 114 is shown as being separate and apart from the target processing units 102, this is not a requirement. SLB 114, in fact, may run on one of the target processing units. In this embodiment, when such a target processing unit fails, SLB 114 will fail along with the replication agent 106 running on the failed target processing unit. Accordingly, stand-by SLB 116 will not receive any replication message from the failed replication agent 106. Thus, connection table 123 will not be an exact duplicate of connection table 117. However, as long as the other replication agents have not failed, then connection table 123 will contain all of the records from connection table 117 that map a session to a target processing unit other than the failed target processing unit, which means that stand-by SLB will be able to route all of the active sessions that were not mapped to the failed target processing unit 102.

Figure 4:
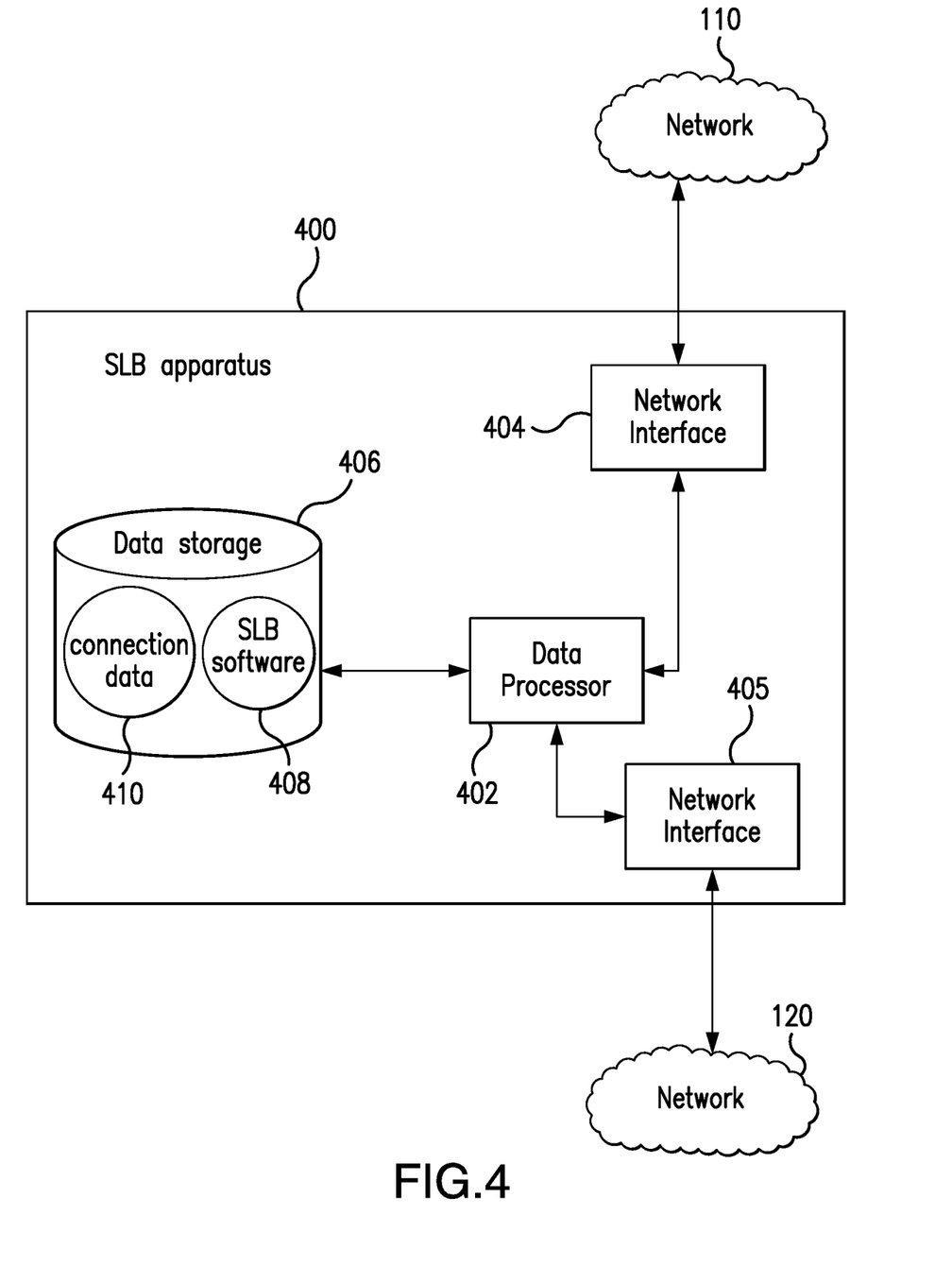
FIG. 4 is a functional block diagram of an SLB apparatus according to some embodiments.

Referring now to FIG. 4, FIG. 4 illustrates a block diagram of an SLB apparatus 400, according to some embodiments, configured to perform SLB functions described above. As shown in FIG. 4, SLB 400 may include: a data processor 402, which may include one or more microprocessors and/or one or more circuits, such as an application specific integrated circuit (ASIC), Field-programmable gate arrays (FPGAs), etc; a network interface 404 for interfacing with network 110; a network interface 405 for interfacing with network 120; a storage system 406, which may include one or more non-volatile storage devices and/or one or more volatile storage devices (e.g., random access memory (RAM)). In embodiments where data processor 402 includes a microprocessor, computer instructions 408 (i.e., software) may be stored in storage system 406. For example, the computer instructions 408 may be embodied in a computer program stored using a computer readable means, such as, but not limited to magnetic media (e.g., a hard disk), optical media (e.g., a DVD), memory devices (e.g., random access memory), etc. In some embodiments, computer instructions 408 is configured such that when computer instructions 408 are executed, SLB 400 is operable to perform steps described above (e.g., steps describe above with reference to the flow charts shown in FIGS. 2 and 3). In other embodiments, SLB 400 is configured to perform steps described above without the need for software 408. That is, for example, data processor 402 may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A cold stand-by method for recovering from a failure of a primary server load balancer (SLB), the method comprising:

the primary SLB receiving a first packet;
the primary SLB obtaining data included in the received first packet;
the primary SLB using the obtained data to generate a first session identifier identifying a first session;
the primary SLB determining whether the packet corresponds to a new session;
in response to determining that the packet corresponds to a new session, the primary SLB selecting a first target processing unit from a plurality of available target processing units, the plurality of available target processing units comprising the first target processing unit and a second target processing unit;
after selecting the first target processing unit, the primary SLB forwarding the packet to the first target processing unit;
an SLB monitor detecting that the primary SLB has experienced a failure;
in response to detecting that the primary SLB has experienced a failure, the SLB monitor causing the first target processing unit to transmit to a stand-by SLB a message comprising the first session identifier and a first target processing unit identifier identifying the first target processing unit;
in response to receiving the message, the stand-by SLB storing information linking the first session identifier with the first target processing unit identifier;
the stand-by SLB receiving a second packet;
the stand-by SLB obtaining data included in the received second packet;
the stand-by SLB using the obtained data to generate a second session identifier;
the stand-by SLB determining whether the packet corresponds to a new session;
in response to determining that the packet does not correspond to a new session, the stand-by SLB obtaining a target processing unit identifier with which the second session identifier is linked;
after obtaining the target processing unit identifier with which the second session identifier is linked, the stand-by SLB forwarding the second packet to a target processing unit identified by the target processing unit identifier with which the second session identifier is linked.

2. The method of claim 1, wherein the obtained data comprises a network source address, a network destination address, a source port number and a destination port number.

3. The method of claim 2, wherein using the obtained data to generate the first session identifier comprises using the network source address, the network destination address, the source port number and the destination port number to generate the first session identifier.

4. The method of claim 1, wherein determining whether the packet corresponds to a new session comprises determining whether the packet includes a request to establish a connection.

5. The method of claim 1, wherein determining whether the packet corresponds to a new session comprises determining whether the first session identifier matches a session identifier stored in a connection data structure that is used to store session identifiers for active sessions.

6. The method of claim 1, wherein causing the first target processing unit to transmit to the stand-by SLB the message comprising the first session identifier consists of transmitting a control message to a replication agent running on the first target processing unit.

7. The method of claim 1, wherein the SLB monitor is a component of the stand-by SLB.

8. A system for recovering from the failure of a primary server load balancer (SLB) that is operable to balance traffic across a plurality of target processing units using connection data that comprises information mapping sessions with target processing units, the system comprising:
    an SLB monitor; and
    a stand-by SLB, wherein
    the SLB monitor is configured to detect when the primary SLB has experienced a failure;
    the SLB is further configured such that, in response to detecting that the primary SLB has experienced a failure, the SLB monitor causes a target processing unit to transmit to the stand-by SLB a message comprising a session identifier and a target processing unit identifier identifying the target processing unit;
    the stand-by SLB is configured such that, in response to receiving the message, the stand-by SLB stores information linking the session identifier with the target processing unit identifier; and
    the stand-by SLB is further configured such that, in response to the stand-by SLB receiving a packet, the stand-by SLB:
    obtains data included in the received packet;
    uses the obtained data to generate a second session identifier;
    determines whether the packet corresponds to a new session;
    in response to determining that the packet does not correspond to a new session, the stand-by SLB obtains a target processing unit identifier with which the second session identifier is linked; and
    after obtaining the target processing unit identifier with which the second session identifier is linked, forwards the packet to a target processing unit identified by the target processing unit identifier with which the second session identifier is linked.

9. The system of claim 8, wherein the obtained data comprises a network source address, a network destination address, a source port number and a destination port number.

10. The system of claim 9, wherein using the obtained data to generate the second session identifier comprises using the network source address, the network destination address, the source port number and the destination port number to generate the second session identifier.

11. The system of claim 8, wherein determining whether the packet corresponds to a new session comprises determining whether the packet includes a request to establish a connection.

12. The system of claim 8, wherein determining whether the packet corresponds to a new session comprises determining whether the second session identifier matches a session identifier stored in a connection data structure that is used to store session identifiers for active sessions.

13. The system of claim 8, wherein the SLB monitor is configured to cause the first target processing unit to transmit to the stand-by SLB the message comprising the first session identifier by transmitting a control message to a replication agent running on the first target processing unit.

14. The system of claim 8, wherein the SLB monitor is a component of the stand-by SLB.

15. A primary server load balance (SLB) for balancing traffic across a plurality of target processing units, wherein the primary SLB is operable to:
    receive a packet corresponding to a session;
    obtain data included in the received first packet;
    use the obtained data to generate a session identifier identifying the session;
    determine whether the session to which the packet corresponds is a new session; and
    in response to determining that the session to which the packet corresponds is a new session:
    (a) use a load balancing procedure to select a particular target processing unit from the plurality of target processing units,
    (b) update the stored connection data so that the connection data will comprise information mapping the session with the selected target processing unit, and
    (c) transmit to a replication agent running on the selected target processing unit a connection data update message comprising the generated session identifier identifying the session.

16. A method performed by a primary server load balance (SLB) for balancing traffic across a plurality of target processing units, the method comprising:
    receiving a packet corresponding to a session;
    obtaining data included in the received first packet;
    using the obtained data, generating a session identifier identifying the session;
    determining whether the session to which the packet corresponds is a new session; and
    in response to determining that the session to which the packet corresponds is a new session:
    (a) using a load balancing procedure to select a particular target processing unit from the plurality of target processing units,
    (b) updating the stored connection data so that the connection data will comprise information mapping the session with the selected target processing unit, and
    (c) transmitting to a replication agent running on the selected target processing unit a connection data update message comprising the generated session identifier identifying the session.

17. A target processing unit, the target processing unit being operable to:
    receive from a primary server load balancer (SLB) a packet comprising application data;
    in response to receiving the packet, provide the application data to an application running on the target processing unit;
    receive from the primary SLB a connection data update message comprising a session identifier generated by the primary SLB;
    store the session identifier in response to receiving the connection data update message;
    receive a synchronization message indicating that the primary SLB has experienced a failure; and
    in response to receiving the synchronization message, retrieve the stored session identifier and transmit to a stand-by SLB a connection data replication message comprising the session identifier generated by the primary SLB and a target processing unit identifier identifying the target processing unit.

18. The target processing unit of claim 17, wherein the target processing unit is configured such that in response to receiving the synchronization message, the target processing unit also transmits to a second stand-by SLB a second connection data replication message, wherein the second connection data replication message comprises a second session identifier that was generated by the primary SLB and received from the primary SLB.

19. A method performed by a target processing unit, the method comprising:

receiving from a primary server load balancer (SLB) a packet comprising application data;

in response to receiving the packet, providing the application data to an application running on the target processing unit;

receiving from the primary SLB a connection data update message comprising a session identifier generated by the primary SLB;

storing the session identifier in response to receiving the connection data update message;

receiving a synchronization message indicating that the primary SLB has experienced a failure; and in response to receiving the synchronization message indicating that the primary SLB has experienced a failure:

1) retrieving the stored session identifier; and
2) transmitting to a first stand-by SLB a connection data replication message comprising the session identifier generated by the primary SLB and a target processing unit identifier identifying the target processing unit.

20. The method of claim 19, further comprising:

the target processing unit receiving a second session identifier that was generated by the primary SLB, and the target processing unit transmitting to a second stand-by SLB a second connection data replication message in response to receiving the synchronization message, the second connection data replication message comprising the second session identifier that was generated by the primary SLB and received from the primary SLB.

* * * * *